United States Patent [19]

Ishikawa et al.

[11] Patent Number: 5,629,075
[45] Date of Patent: May 13, 1997

[54] MAGNETIC RECORDING MEDIUM HAVING A SUBSTRATE CONTAINING MAGNETIC POWDER

[75] Inventors: Akira Ishikawa; Hidehiko Nakayama; Kazutaka Yamashita, all of Tochigi-ken, Japan

[73] Assignee: Kao Corporation, Tokyo, Japan

[21] Appl. No.: 427,870

[22] Filed: Apr. 26, 1995

[30] Foreign Application Priority Data

Apr. 28, 1994 [JP] Japan .................................. 6-091246
Jun. 29, 1994 [JP] Japan .................................. 6-148357

[51] Int. Cl.$^6$ .................................. G11B 5/704
[52] U.S. Cl. .................. 428/216; 428/328; 428/329; 428/694 BS; 428/694 SL; 428/900
[58] Field of Search .................. 428/65.3, 216, 428/328, 329, 694 BS, 900, 694 SL; 252/62.54; 360/2; 283/82; 235/493; 524/435

[56] References Cited

U.S. PATENT DOCUMENTS

| | | | |
|---|---|---|---|
| 3,808,404 | 4/1974 | Riggs | 235/61.12 M |
| 4,303,949 | 12/1981 | Peronnet | 360/2 |
| 4,400,457 | 8/1983 | Johnson | 430/140 |
| 5,434,917 | 7/1995 | Naccache et al. | 380/23 |

OTHER PUBLICATIONS

Japanese Patent Laid-Open Appln. No. 57-162128 Oct. 1982.

Japanese Patent Laid-Open Appln. No. 5-73883 Mar. 1993.

*Primary Examiner*—Stevan A. Resan
*Attorney, Agent, or Firm*—Oblon, Spivak, McClelland, Maier & Neustadt, P.C.

[57] ABSTRACT

Disclosed is a magnetic recording medium comprising a magnetic support 1 containing a magnetic powder, and at least a nonmagnetic layer 2 provided on the magnetic support 1 and a magnetic layer 3 provided on the nonmagnetic layer 2. The magnetic powder comprises a ferromagnetic powder, preferably a powder of soft magnetic materials and/or a powder of iron oxide with low remanent induction. The medium is suitable for high-density recording, especially exhibiting an excellent output characteristic.

6 Claims, 1 Drawing Sheet

MAGNETIC RECORDING MEDIUM HAVING A SUBSTRATE CONTAINING MAGNETIC POWDER

BACKGROUND OF THE INVENTION

1. Field of the Invention

The present invention relates to a magnetic recording medium for high-density recording, especially having excellent output characteristics.

2. Description of Related Art

Magnetic recording media have heretofore been used popularly in the form of tapes, discs, drums, sheets, etc. Such magnetic recording media are generally produced by coating a magnetic coating composition consisting essentially of a magnetic powder and a binder on a nonmagnetic support such as a polyester film. In recent years, magnetic recording media have been required to be small-sized while meeting the requirement for high recording density. To this end, for example, proposals for improving the coercive force and the saturation magnetization of the media and for reducing the thickness of the magnetic layer thereof have been made. In addition to the above-mentioned requirements, the development of magnetic recording media having excellent output characteristics is strongly desired in order to meet the requirements for obtaining magnetic recording media of high quality.

SUMMARY OF THE INVENTION

It is therefore an object of the present invention to provide a magnetic recording medium for high-density recording especially having excellent output characteristics.

We, the present inventors have assiduously studied and found that a magnetic recording medium having a magnetic support containing a magnetic powder, in place of a conventional nonmagnetic support, especially that where the magnetic support contains, as the magnetic powder, a powder of a soft magnetic material, a powder of iron oxide with low remanent induction or a powder of a hard magnetic material can attain the above-mentioned object.

The present invention has been completed on the basis of the above-mentioned findings, therefore providing a magnetic recording medium comprising a magnetic support containing a magnetic powder, at least a nonmagnetic layer provided on the magnetic support and a magnetic layer provided on the nonmagnetic layer, in which the thickness of the magnetic layer is from 0.05 to 1.5 µm, the thickness of the nonmagnetic layer is from 0.5 to 4 µm and the coercive force of the magnetic layer is from 1300 to 2500 Oe.

The magnetic powder to be in the magnetic support of the magnetic recording medium of the present invention is preferably one or more powders selected from the group consisting of a powder of soft magnetic materials, a powder of iron oxide with low remanent induction and a powder of hard magnetic materials, more preferably a powder of soft magnetic materials or a powder of iron oxide with low remanent induction.

In the magnetic recording medium of the present invention, only the magnetic layer participates in recording and reproduction while the magnetic support exhibits such an effect that it improves the advantageous magnetic orientation in terms of magnetic recording in forming the nonmagnetic layer and the magnetic layer. As a result of various investigations, it has been found that the powder of a soft magnetic material or the powder of iron oxide with low remanent induction to be in the magnetic support can yield more effective magnetic orientation. In addition, it has also been found that the magnetic powder to be in the magnetic support may be a powder of a hard magnetic material.

The magnetic recording medium of the present invention is usable for high-density recording, while having excellent output characteristics in a high-frequency zone.

BRIEF DESCRIPTION OF THE DRAWINGS

FIG. 2a shows an embodiment of a single-layered constitution of the magnetic support, comprising only a single magnetic part; FIG. 2b shows an embodiment of a two-layered constitution of the same, having a nonmagnetic part provided on one surface of a magnetic part; FIG. 2c shows an embodiment of a two-layered constitution of the same, having a magnetic part provided on one surface of a nonmagnetic part; FIG. 2d shows an embodiment of a three-layered constitution of the same, having two nonmagnetic parts provided on the both surfaces of a magnetic part; FIG. 2e shows an embodiment of a three-layered constitution of the same, having two magnetic parts provided on the both surfaces of a nonmagnetic part; and FIG. 2f shows an embodiment of a two-layered constitution of the same, having a magnetic part provided on one surface of a nonmagnetic part.

DETAILED DESCRIPTION OF THE INVENTION

Figure 1:
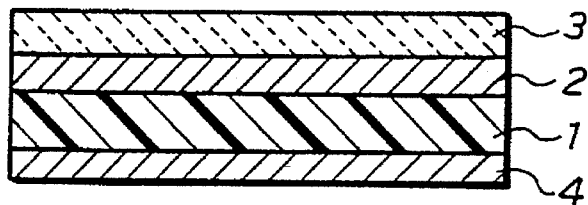
FIG. 1 is an outline of the cross-sectional view showing the constitution of one embodiment of the magnetic recording medium of the present invention.

The magnetic recording medium of the present invention is, as shown by FIG. 1, composed of the magnetic support 1, the nonmagnetic layer 2 provided on the magnetic support 1, and the magnetic layer 3 provided on the nonmagnetic layer 2, optionally comprising a back coat layer 4 provided on the back surface of the magnetic support 1.

The magnetic support 1 has at least the magnetic part A consisting of a matrix component comprising a thermoplastic resin and a filler component comprising a magnetic powder (see FIG. 2a to FIG. 2e).

The thermoplastic resin includes polyesters, such as polyethylene terephthalate, polybutylene terephthalate, polyethylene naphthalate, polycyclohexylene-dimethylene terephthalate, and polyethylene bisphenoxycarboxylate; polyolefins, such as polyethylene, and polypropylene cellulose derivatives, such as cellulose acetate butyrate, and cellulose acetate propionate; vinyl resins, such as polyvinyl chloride, and polyvinylidene chloride; as well as polyamides, polyimides, polycarbonates, polysulfones, polyether-ether ketones, polyurethanes, etc. These resin components can be used singly or as their mixtures.

The magnetic powder to be in the magnetic support of the medium of the present invention is generally a ferromagnetic powder, which is preferably selected from a powder of a soft magnetic material, a powder of iron oxide exhibiting low remanent induction which is generally in magnetic toners, etc. (hereinafter referred to a powder of iron oxide with low remanent induction) and a powder of a hard magnetic material. These can be used singly or as their mixtures.

The powder of a soft magnetic material is a magnetic powder which comprises one or more of metals, metal oxides, alloys, amorphous alloys, etc. and which is known to have a high permeability and a low coercive force.

The powder of a soft magnetic material to be in the magnetic support of the medium of the present invention is not specifically restricted in terms of the origin, etc. but is preferably one that is employed in so-called miniatural device such as magnetic heads and electronic circuits. For instance, usable as the powder are the soft magnetic materials described by S. Chikazumi in "Physics of Ferromagnetism, Vol. II—Magnetic Engineering Application" (published by Shoka-bo Co., Tokyo, 1984), pp. 368 to 376, which is incorporated herein by reference.

Specific examples of the powders of soft magnetic materials which are preferably employed in the present invention include iron-silicon alloys, iron-aluminium alloys, iron-nickel alloys, iron-cobalt alloys, iron-cobalt-nickel alloys, nickel-cobalt alloys, Sendust, manganese-zinc ferrites, nickel-zinc ferrites, magnesium-zinc ferrites and magnesium-manganese ferrites.

The powder of iron oxide with low remanent induction is a powder of iron oxide, such as $\gamma$-$Fe_2O_3$ and magnetite, having a remanence of 30 emu/g or less, preferably 15 emu/g or less, more preferably 10 emu/g or less and having a coercive force of 150 Oe or less, preferably 120 Oe or less, more preferably 100 Oe or less.

The powder of a hard magnetic material is a powder of magnetic metal(s), a powder of magnetic oxide(s), etc.

Specific examples of the powders of magnetic metals include powders of Fe—Co, Fe—Ni, Fe—Al, Fe—Ni—Al, Co—Ni, Fe—Co—Ni, Fe—Ni—Al—Zn and Fe—Al—Si, while those of the powders of magnetic oxides include powders of the following hard magnetic materials.

Powders of acicular magnetic iron oxides having a high coercive force, such as $\gamma$-iron oxide and magnetite; powders of hard magnetic materials to be prepared by adding metals, such as Cr, Mn, Co and Ni, to the magnetic iron oxides; powder of chromium dioxide; powders of hard magnetic materials to be prepared by adding metals such as Na, K, Fe and Mn, non-metallic elements such as P, or oxides of these elements to the chromium dioxide; micro-tabular barium ferrite; and powders of hard magnetic materials to be prepared by substituting a part of the Fe atoms in the barium ferrite with atoms such as Ti, Co, Zn, Ni and V.

Where the magnetic support of the medium of the present invention contains the powder of a hard magnetic material, it is desirable that the powder is combined with the powder of a soft magnetic material and/or the powder of iron oxide with low remanent induction. One preferred embodiment of the composition comprises from 2 to 5000 parts by weight of the powder of a hard magnetic material relative to 100 parts by weight of the powder of a soft magnetic material or the powder of iron oxide with low remanent induction existing in the composition.

The powder of a soft magnetic material, the powder of iron oxide with low remanent induction and the powder of a hard magnetic material can be ground and classified to have desired sizes.

In order to improve the dispersibility, etc. of the magnetic powder, such as the powder of a soft magnetic material, the powder of iron oxide with low remanent induction and the powder of a hard magnetic material, the magnetic powder may be subjected to surface treatment.

The surface treatment may be conducted, for example, according to the methods described in "Characterization of Powder Surfaces" (published by Academic Press). For instance, it may be conducted by a method of coating the surfaces of the particles of the magnetic powder with inorganic oxides. The inorganic oxides employable in the method include $Al_2O_3$, $SiO_2$, $TiO_2$, $ZrO_2$, $SnO_2$, $Sb_2O_3$ and ZnO. These can be used singly or as their mixtures.

Apart from the above-mentioned method, the surface treatment may also be conducted by organic treatment, such as silane-coupling treatment, titanium-coupling treatment and alumina-coupling treatment.

Figure 2A:
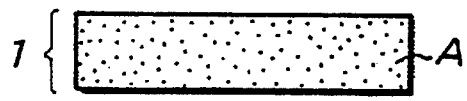
FIG. 2a through FIG. 2f are outline of the cross-sectional views showing the constitutions of embodiments of the magnetic support of the magnetic recording medium of FIG. 1. Concretely.

The magnetic support 1 may have a single-layered structure comprising only the magnetic part $\underline{A}$, as shown by FIG. 2a. Alternatively, it may have a multi-layered structure comprising the magnetic part $\underline{A}$ and the nonmagnetic part $\underline{B}$, as shown by FIGS. 2b to 2e.

Concretely, the magnetic support 1 may have any of the following structures (a) to (e).

(a) A single-layered structure comprising only the magnetic part $\underline{A}$, as shown by FIG. 2a.

Figure 2B:
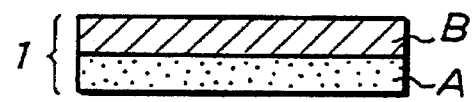

(b) A two-layered structure comprising the nonmagnetic part $\underline{B}$ provided on one surface of the magnetic part $\underline{A}$, by which the part $\underline{A}$ is to face the magnetic layer 3 of the magnetic recording media via the part $\underline{B}$, as shown by FIG. 2b.

Figure 2C:
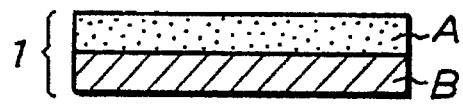

(c) A two-layered structure comprising the magnetic part $\underline{A}$ provided on one surface of the nonmagnetic part $\underline{B}$, as shown by FIG. 2c.

Figure 2D:
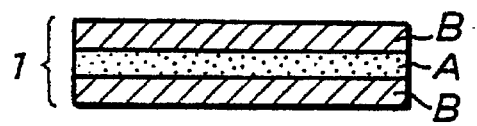
Figure 2E:
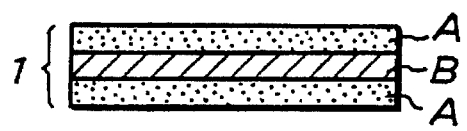

(d) A three-layered structure comprising the nonmagnetic parts $\underline{B}$ provided on the both surfaces of the magnetic part $\underline{A}$, as shown by Fig. 2d.

(e) A three-layered structure comprising the magnetic parts $\underline{A}$ provided on the both surfaces of the nonmagnetic part $\underline{B}$.

The total thickness of the magnetic support having any of the structures illustrated by FIGS. 2a to 2e varies, depending on the type of the final magnetic recording medium having the support, but is generally within the range between 1 µm and 300 µm.

It is desirable that the ratio of the thickness of the magnetic part $\underline{A}$ to that of the nonmagnetic part $\underline{B}$ in the magnetic support illustrated in any of Figs. 2b to 2e is from 1:99 to 99:1, preferably from 2:98 to 98:2, more preferably from 5:95 to 95:5.

The material for the nonmagnetic part $\underline{B}$ is not specifically defined, provided that it is a nonmagnetic material. Preferably, however, the material is a thermoplastic resin such as that to be used as the matrix component in the magnetic part $\underline{A}$. It is possible that the nonmagnetic part $\underline{B}$ is made of only such a thermoplastic resin. Preferably, however, the nonmagnetic part $\underline{B}$ contains various fillers, in addition to the part-forming material, in order that the surface properties of the outer surface of the nonmagnetic part $\underline{B}$ and also the running properties of the magnetic recording medium having the support are controlled to the desired ones. The fillers may be nonmagnetic powders such as those to be in the nonmagnetic layer, which will be referred to hereinunder. The nonmagnetic powder usable as the filler has a particle size of preferably 0.8 µm or less, more preferably from 0.01 to 0.2 µm, and the content of the filler powder in the part $\underline{B}$ may be 5% by weight or less, preferably from 0.01 to 2% by weight.

The composition comprising the thermoplastic resin and the magnetic powder which constitutes the magnetic part $\underline{A}$ may be varied. In the magnetic support of any of the structures illustrated by FIGS. 2a to 2e, however, it is desirable that the proportion of the magnetic powder is from 0.1 to 1000 parts by weight, preferably from 0.2 to 100 parts by weight, more preferably from 0.3 to 80 parts by weight, relative to 100 parts by weight of the thermoplastic resin existing in the support.

Figure 2F:
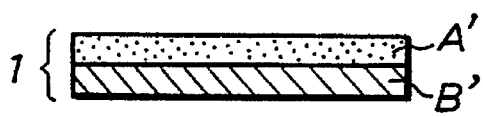

As another embodiment of the structure of the magnetic support, mentioned is a structure to be constructed by coating a nonmagnetic film with a magnetic coating composition, such as that illustrated by Fig. 2f. In this embodiment, the nonmagnetic film B' corresponds to the nonmagnetic part while the magnetic film A' that has been formed on the film B' by coating it with the magnetic coating composition containing a magnetic powder such as that mentioned hereinabove corresponds to the magnetic part.

In the film A' of the magnetic support illustrated by FIG. 2f, it is desirable that the proportion of the magnetic powder is from 10 to 1500 parts by weight, preferably from 200 to 1200 parts by weight, more preferably from 500 to 1000 parts by weight, relative to 100 parts by weight of the thermoplastic resin existing in the support.

Hereinunder mentioned are preferred embodiments for producing the magnetic support (I) having the structure illustrated by FIG. 2a and the magnetic support (II) having any of the structures illustrated by FIGS. 2b to 2e.

(A) Preferred embodiment for producing the magnetic support having the structure illustrated by FIG. 2a:

The thermoplastic resin and the magnetic powder both mentioned hereinabove are fully dried and then mixed at the ratio falling within the range mentioned hereinabove, the resulting mixture is further melted and mixed in an extruder to obtain a mixture of granules (a raw material mixture for forming the magnetic part), and this is shaped through a melt-extrudable shaping machine.

If desired, the magnetic powder may be added to the polymerization system to give the thermoplastic resin along with reactive monomers before the start of the polymerization or to the same in the course of the polymerization.

(B) Preferred embodiment for producing the magnetic support having any one of the structures illustrated by FIGS. 2b to 2e:

A raw material mixture for forming the magnetic part, such as that mentioned above, and a raw material mixture for forming the nonmagnetic part consisting essentially of a thermoplastic resin such as that mentioned above are co-extruded through a melt-extrudable shaping machine to give a sheet having a desired structure.

The "co-extruding method" as referred to herein includes a method for simultaneously co-extruding both the raw material mixture for forming the magnetic part and the raw material mixture for forming the nonmagnetic part to give a two-layered or multi-layered magnetic support, and a method for extruding either one of the raw material mixture for forming the magnetic part and the raw material mixture for forming the nonmagnetic part to give a film followed by extruding the raw material mixture for forming the magnetic part and/or the raw material mixture for forming the nonmagnetic part onto the film to give a two-layered or multi-layered magnetic support.

The magnetic support having the structure illustrated by FIG. 2f can be produced according to the method mentioned below.

In conducting the step of extruding only the raw material for forming the nonmagnetic part, the magnetic coating composition is coated over the extruded nonmagnetic film B' at any stage during the step to form the magnetic film (magnetic part) A' over the film B' to give the magnetic support.

In this method, however, it is desirable that the magnetic film A' in the structure of FIG. 2f is neither swollen nor dissolved by the solvent to be used for forming the nonmagnetic layer and the magnetic layer over the film A'.

In the method for producing the magnetic support, the magnetic part or the magnetic film A' may optionally be subjected to magnetic orientation or calendering.

In the magnetic support 1 having the structure of FIG. 2f that has been produced according to the method mentioned hereinabove, the magnetic film A' may be coated with the nonmagnetic part B or the like by extruding thereover the raw material for forming the nonmagnetic part or the like.

The nonmagnetic layer to be provided on the magnetic support is a layer which is formed by coating a nonmagnetic coating composition over the magnetic support.

The nonmagnetic coating composition to be used for forming the nonmagnetic layer is preferably a coating composition comprising a nonmagnetic powder, a binder and a solvent or a coating composition comprising a binder and a solvent.

The nonmagnetic powder is not specifically defined, provided that it is a powder of a nonmagnetic material, but is preferably selected from powders of carbon black, graphite, titanium oxide, barium sulfate, zinc sulfite, magnesium carbonate, calcium carbonate, zinc oxide, calcium oxide, magnesium oxide, tungsten disulfide, molybdenum disulfide, boron nitride, tin dioxide, silicon dioxide, nonmagnetic chromium oxide, alumina, silicon carbide, cerium oxide, corundum, artificial diamond, nonmagnetic iron oxide, garnet, silica stone, silicon nitride, molybdenum carbide, boron carbide, tungsten carbide, titanium carbide, diatomaceous earth, dolomite, resinous materials, etc. Of these, preferred are carbon black, titanium oxide, barium sulfate, calcium carbonate, alumina, nonmagnetic iron oxide, etc.

The nonmagnetic powder may be subjected to surface treatment such as that mentioned hereinabove, in order to improve the dispersibility, etc. of the powder.

The nonmagnetic powder to be in the nonmagnetic layer preferably has a particle size of from 0.001 to 3 μm, more preferably from 0.005 to 1 μm, most preferably from 0.005 to 0.5 μm.

It is desirable that the nonmagnetic powder incorporated into the nonmagnetic coating composition to form the nonmagnetic layer on the magnetic support in such a way that the content of the nonmagnetic powder in the nonmagnetic layer is preferably from 5 to 99% by weight, more preferably from 30 to 95% by weight, most preferably from 50 to 95% by weight.

As the binder, usable are thermoplastic resins, thermosetting resins, reactive resins, etc. The binder may comprise one or more of these resins.

Concretely, the binder includes polyvinyl chloride resins, polyesters, polyurethanes, nitrocellulose and epoxy resins, and also the resins described in JP-A 57-162128, page 2, right top column, line 19 to right bottom column, line 19, etc. (The term "JP-A" as referred to herein means an "unexamined published Japanese patent application".) The binder may contain polar groups in order to have improved dispersibility.

The content of the binder in the coating composition is preferably from about 5 to 100 parts by weight, more preferably from 5 to 70 parts by weight, relative to 100 parts by weight of the nonmagnetic powder existing in the composition.

The solvent may be selected from ketone solvents, ester solvents, ether solvents, aromatic hydrocarbon solvents, chlorohydrocarbon solvents, etc. Concretely, the solvents described in JP-A 57-162128, from page 3, right bottom column, line 17 to page 4, left bottom column, line 10 are usable.

The nonmagnetic coating composition may optionally contain additives which are generally used in producing magnetic recording media, such as a dispersing agent, a lubricant, an abrasive, an antistatic agent, an anti-rusting agent, an antiseptic and a hardening agent, if desired. Examples of such additives are described in, for example, JP-A 57-162128, page 2, from left top column, line 6 to right top column, line 10 and page 3, from left top column, line 6 to right top column, line 18.

To prepare the nonmagnetic coating composition, for example, the nonmagnetic powder and the binder are put into a Nauter mixer or the like along with a part of the solvent and pre-mixed therein to obtain a mixture, the resulting mixture is kneaded in a continuous pressure kneader or the like, then diluted with another part of the solvent and dispersed in a sand mill or the like, additives such as a lubricant are added thereto, the mixture is filtered, and the balance of the solvent is added thereto along with a hardening agent, etc. and mixed.

The magnetic layer to be provided on the nonmagnetic layer is a layer which is formed by coating a magnetic coating composition over the nonmagnetic layer.

The magnetic coating composition to be used for forming the magnetic layer preferably comprises, as the essential components, a magnetic powder, a binder and a solvent.

The magnetic powder to be in the composition includes powders of ferromagnetic iron oxide, ferromagnetic chromium dioxide and ferromagnetic metals.

The ferromagnetic iron oxide is represented by FeOx ($1.33 \leq x \leq 1.5$), optionally containing metals such as Cr, Mn, Co and Ni.

The ferromagnetic chromium dioxide is $CrO_2$, optionally containing metals such as Na, K, Fe and Mn, oxides of such metals, and nonmetallic elements such as P.

The powders of ferromagnetic metals have a metal content of 70% by weight or more, in which at least one ferromagnetic metal (e.g., Fe, Co, Ni, etc.) account for 80% by weight or more of the metal content therein. Specific examples of the ferromagnetic metals include Fe—Co, Fe—Ni, Fe—Al, Fe—Ni—Al, Co—Ni, Fe—Co—Ni, Fe—Ni—Al—Zn and Fe—Al—Si.

The magnetic powder may contain rare earth elements and transition metal elements, if desired.

The magnetic powder may comprise micro-tabular barium ferrite particles or such particles in which a part of Fe atoms have been substituted by other atoms such as Ti, Co, Zn, Ni and V.

The magnetic powder may be subjected to surface treatment such as that mentioned hereinabove so as to make the powder have improved dispersibility.

As examples of the binder and the solvent to be in the magnetic coating composition, referred to are the above-mentioned examples of the binder and the solvent to be in the nonmagnetic coating composition.

The content of the binder in the magnetic coating composition is preferably from about 5 to 100 parts by weight, more preferably from 5 to 70 parts by weight, relative to 100 parts by weight of the magnetic powder existing in the composition.

The magnetic coating composition may contain various additives such as the above-mentioned additives which may be in the nonmagnetic coating composition.

To prepare the magnetic coating composition, for example, the magnetic powder and the binder are put into a Nauter mixer or the like along with a part of the solvent and pre-mixed therein to obtain a mixture, the resulting mixture is kneaded in a continuous pressure kneader or the like, then diluted with another part of the solvent and dispersed in a sand mill or the like, additives such as a lubricant are added thereto, the mixture is filtered, and the balance of the solvent is added thereto along with a hardening agent such as a polyisocyanate and mixed.

In the magnetic recording medium of the present invention, the thickness of the magnetic layer is preferably from 0.05 to 1.5 µm, more preferably from 0.1 to 1.2 µm, and the thickness of the nonmagnetic layer is preferably from 0.5 to 4 µm, more preferably from 0.5 to 3.5 µm. If the thickness of the magnetic layer is smaller than 0.05 µm, uniform coating of the layer is difficult with the result that the output of the medium is lowered and the dropout thereof is increased. If it is larger than 1.5 µm, the output of the medium is lowered due to the thickness demagnetization. If the thickness of the nonmagnetic layer is smaller than 0.5 µm, the stiffness of the magnetic tape is lowered with the result that the output of the tape is lowered due to the insufficient contact of the tape with the head.

The coercive force of the magnetic layer is preferably from 1300 to 2500 Oe, more preferably from 1300 to 2400 Oe. If the coercive force is less than 1300 Oe, the medium has insufficient output characteristics in a high-frequency zone, but if it is more than 2500 Oe, the magnetic field around the head is insufficient. If so, the output characteristics of the medium are lowered.

The magnetic recording medium of the present invention is suitable as magnetic tapes, especially as 8 mm video tapes, DAT tapes, etc. It is also usable as other recording media such as floppy discs.

The outline of one embodiment for the production of the magnetic recording medium of the present invention is described hereinunder.

First, the nonmagnetic coating composition and the magnetic coating composition are coated on the magnetic support by a wet-on-wet system for simultaneous two-layer coating to form thereon a nonmagnetic layer and a magnetic layer which may have the dry thickness falling within the range defined hereinabove. Next, the thus-coated magnetic layer is oriented in a magnetic field and dried. The thus-coated medium is wound up. Afterwards, this may be calendered and coated with a back coat layer, if desired. Next, this is shaped into a desired final product. To produce a magnetic tape from this, for example, this is aged at from 40° C. to 70° C. for 6 to 72 hours and then slit into a desired width.

The wet-on-wet system for simultaneous multilayer coating is described in, for example, JP-A 5-73883, from column 42, line 31 to column 43, line 31, etc. The wet-on-wet system for simultaneous multilayer coating is conducted by coating the magnetic coating composition over the nonmagnetic layer before it is dried to form thereon the magnetic layer. According to this, the interface between the nonmagnetic layer and the magnetic layer formed is smooth and the surface of the magnetic layer is also smooth. The magnetic recording medium thus produced exhibits few dropouts and is therefore usable for high-density recording. In addition, the running durability of the coated layers (both the magnetic layer and the nonmagnetic layer) is excellent.

The magnetic layer is oriented in a magnetic field before it is dried. For example, when a magnetic tape is produced according to the present invention, a magnetic field of about 500 Oe or more, preferably from about 1000 to 10000 Oe is applied to the coated tape in the direction parallel to the surface of the magnetic layer coated, or the coated tape is passed through a solenoid or the like at from 1000 to 10000 Oe while the magnetic layer coated is still wet.

The magnetic layer coated is dried, for example, by applying thereto a hot gas heated at from 30° C. to 120° C., while controlling the temperature and the amount of the gas so as to control the degree of the dryness of the layer.

One embodiment of the calendering treatment is super-calendering to be conducted by passing the coated medium between two rolls, for example, between a metal roll and a cotton roll, or synthetic resin roll and between a metal roll and a metal roll. Such calendering may be conducted at from 60° C. to 140° C. and at from 100 to 500 kg/cm.

The back coat layer is optionally provided on the back surface of the magnetic support (not coated with the nonmagnetic layer and the magnetic layer). To form this, in general, a coating composition which is generally used for forming an ordinary back coat layer is coated on the back surface of the magnetic support.

The coating composition for the back coat layer can be obtained by suitably mixing a nonmagnetic powder, a binder, a dispersing agent, a lubricant, a hardening agent, a solvent, etc. such as those described in detail hereinabove for the nonmagnetic coating composition. This can be produced according to conventional methods for producing ordinary coating compositions for back coat layers.

If desired, the surface of the magnetic layer of the magnetic recording medium of the present invention may be finished by polishing or cleaning it. The coating of the nonmagnetic coating composition and the magnetic coating composition on the magnetic support may be conducted also according to conventional successive multi-layer coating methods.

The magnetic recording medium of the present invention is described more concretely by means of the following examples, which are not intended to restrict the scope of the present invention.

EXAMPLE 1

Production of Magnetic Supports:
Production of Magnetic Support (I) Illustrated by FIG. 2b:

Granules of polyethylene terephthalate having an intrinsic viscosity of 0.60 and a magnetic powder of Ni—Zn ferrite having a mean particle size of 0.02 μm were mixed to have a content of the magnetic powder of 15% by weight, and then melted and mixed with an extruder to obtain a granular mixture.

The mixture was co-extruded along with granules of polyethylene terephthalate not containing the magnetic powder to obtain a two-layered film.

The thus-obtained film was stretched 3.3 times in the lengthwise direction and also 3.3 times in the widthwise direction and then heat-treated to obtain a magnetic support (I) having the constitution illustrated by FIG. 2b. The support (I) had a total thickness of 7.5 μm, in which the thickness of the magnetic part $\underline{A}$ was 2 μm.

Production of Magnetic Support (II) Illustrated by FIG. 2c:

A magnetic support (II) having the constitution illustrated by FIG. 2c was produced in the same manner as in the production of the above-mentioned magnetic support (I), except that Mn—Zn ferrite having a mean particle size of 0.015 μm was used in place of Ni—Zn ferrite. This had a total thickness of 7.5 μm, in which the thickness of the magnetic part $\underline{A}$ was 3 μm.

Production of Magnetic Support (III) Illustrated by FIG. 2c:

A magnetic support (III) having the constitution illustrated by FIG. 2c was produced in the same manner as in the production of the above-mentioned magnetic support (I), except that magnetite powder comprising spherical particles having a mean particle size of 0.09 μm, a coercive force of 78 Oe, a saturation magnetization of 83 emu/g and a remanence of 9 emu/g was used in place of Ni—Zn ferrite. This had a total thickness of 7.5 μm, in which the thickness of the magnetic part $\underline{A}$ was 3 μm.

Production of Nonmagnetic Support:

A nonmagnetic support film of only polyethylene terephthalate having a thickness of 7.5 μm was produced in the same manner as above.

Preparation of Magnetic Coating Compositions, Nonmagnetic Coating Composition and Coating Composition for Back Coat Layer:

The following components, except polyisocyanate, fatty acid and fatty acid ester, were put into a Nauter mixer along with a part of the solvents and mixed therein to obtain a mixture. The resulting mixture was kneaded in a continuous pressure kneader. Next, this was diluted with another part of the solvents, dispersed in a sand mill, mixed with the fatty acid and the fatty acid ester, filtered and mixed with the balance of the solvents and the polyisocyanate to obtain the following magnetic coating compositions, nonmagnetic coating composition and coating composition for back coat layer. Formulation of Magnetic Coating Composition (a):

| Formulation of Magnetic Coating Composition (a): | |
|---|---|
| Acicular magnetic metal powder consisting essentially of iron (Fe:Al:Ba:Si:Ni:Co = 85:2:1:1:3:8) and having a coercive force of 1860 Oe, a saturation magnetization of 137 emu/g, a mean major axis of 0.1 μm, a specific surface area of 61 m²/g, a particle size measured by X-ray of 138 angstroms and an axial ratio of 8 | 100 parts by weight |
| Alumina having a mean particle size of 0.3 μm and a specific surface area of 11 m²/g | 9 parts by weight |
| Carbon black having a mean primary particle size of 20 nm | 1 part by weight |
| Polyvinyl chloride resin having sulfonic acid groups and epoxy groups (sulfonic acid group content: $1.5 \times 10^{-4}$ eq/g; epoxy group content: $6 \times 10^{-4}$ eq/g) and having a mean degree of polymerization of 250 | 9 parts by weight |
| Polyurethane having sulfonic acid groups and having a number average molecular weight measured by GPC of 25000, a weight average molecular weight measured by GPC of 49000 and a sulfonic acid content of $1.9 \times 10^{-4}$ eq/g | 7 parts by weight |
| Stearic acid | 1.5 parts by weight |
| 2-Ethylhexyl oleate | 2 parts by weight |
| Polyisocyanate (Coronate L; trade name of product of Nippon Polyurethane Industrial Co.) | 4 parts by weight |
| Methyl ethyl ketone | 100 parts by weight |
| Toluene | 50 parts by weight |
| Cyclohexanone | 100 parts by weight |
| Formulation of Magnetic Coating Composition (b): | |
| Acicular magnetic metal powder consisting essentially of iron (Fe:Al:Y:Si:Ni:Co = 65:5:3:1:1:25) and having a coercive force of 2090 Oe, a saturation magnetization of 141 emu/g, a mean major axis of 0.11 μm, a specific surface area of 59 m²/g, a particle size measured by X-ray of 165 angstroms and an axial ratio of 8 | 100 parts by weight |
| Alumina having a mean particle size of 0.3 μm and a specific surface area of 11 m²/g | 9 parts by weight |
| Carbon black having a mean primary particle size of 20 nm | 1 part by weight |
| Polyvinyl chloride resin having sulfonic acid groups and epoxy groups (sulfonic acid group content: $1.5 \times 10^{-4}$ eq/g; epoxy group content: $6 \times 10^{-4}$ eq/g) and having a | 9 parts by weight |

| | |
|---|---|
| mean degree of polymerization of 250 | |
| Polyurethane having sulfonic acid groups and having a number average molecular weight measured by GPC of 25000, a weight average molecular weight measured by GPC of 49000 and a sulfonic acid content of $1.9 \times 10^{-4}$ eq/g | 7 parts by weight |
| Stearic acid | 1.5 parts by weight |
| 2-Ethylhexyl oleate | 2 parts by weight |
| Polyisocyanate (Coronate L; trade name of product of Nippon Polyurethane Industrial Co.) | 4 parts by weight |
| Methyl ethyl ketone | 100 parts by weight |
| Toluene | 50 parts by weight |
| Cyclohexanone | 100 parts by weight |

Formulation of Magnetic Coating Composition (c):

| | |
|---|---|
| Barium ferrite having a coercive force of 1580 Oe, a saturation magnetization of 52 emu/g, a mean particle size of 0.05 μm and an aspect ratio of 5 | 100 parts by weight |
| Alumina having a mean particle size of 0.3 μm and a specific surface area of 11 m²/g | 5 parts by weight |
| Carbon black having a mean primary particle size of 20 nm | 3 parts by weight |
| Polyvinyl chloride resin having sulfonic acid groups and epoxy groups (sulfonic acid group content: $1.5 \times 10^{-4}$ eq/g; epoxy group content: $6 \times 10^{-4}$ eq/g) and having a mean degree of polymerization of 250 | 8 parts by weight |
| Polyurethane having sulfonic acid groups and having a number average molecular weight measured by GPC of 25000, a weight average molecular weight measured by GPC of 49000 and a sulfonic acid content of $1.9 \times 10^{-4}$ eq/g | 5 parts by weight |
| Stearic acid | 1.5 parts by weight |
| 2-Ethylhexyl oleate | 2 parts by weight |
| Polyisocyanate (Coronate L; trade name of product of Nippon Polyurethane Industrial Co.) | 3 parts by weight |
| Methyl ethyl ketone | 80 parts by weight |
| Toluene | 40 parts by weight |
| Cyclohexanone | 80 parts by weight |

Formulation of Magnetic Coating Composition (d):

| | |
|---|---|
| Acicular magnetic metal powder consisting essentially of iron (Fe:Al:Ca:Si:Ni = 92:3:1.5:0.5:3) and having a coercive force of 1260 Oe, a saturation magnetization of 143 emu/g, a mean major axis of 0.14 μm, a specific surface area of 49 m²/g, a particle size measured by X-ray of 175 angstroms and an axial ratio of 11 | 100 parts by weight |
| Alumina having a mean particle size of 0.3 μm and a specific surface area of 11 m²/g | 7 parts by weight |
| Carbon black having a mean primary particle size of 20 nm | 3 parts by weight |
| Polyvinyl chloride resin having sulfonic acid groups and epoxy groups (sulfonic acid group content: $1.5 \times 10^{-4}$ eq/g; epoxy group content: $6 \times 10^{-4}$ eq/g) and having a mean degree of polymerization of 250 | 9 parts by weight |
| Polyurethane having sulfonic acid groups and having a number average molecular weight measured by GPC of 25000, a weight average molecular weight measured by GPC of 49000 and a sulfonic acid content of $1.9 \times 10^{-4}$ eq/g | 7 parts by weight |
| Stearic acid | 1.5 parts by weight |
| 2-Ethylhexyl oleate | 2 parts by weight |
| Polyisocyanate (Coronate L; trade name of product of Nippon Polyurethane Industrial Co.) | 4 parts by weight |
| Methyl ethyl ketone | 100 parts by weight |
| Toluene | 50 parts by weight |
| Cyclohexanone | 100 parts by weight |

Formulation of Magnetic Coating Composition (e):

| | |
|---|---|
| Barium ferrite having a coercive force of 2930 Oe, a saturation magnetization of 50 emu/g, a mean particle size of 0.06 μm and an aspect ratio of 5 | 100 parts by weight |
| Alumina having a mean particle size of 0.3 μm and a specific surface area of 11 m²/g | 5 parts by weight |
| Carbon black having a mean primary particle size of 20 nm | 3 parts by weight |
| Polyvinyl chloride resin having sulfonic acid groups and epoxy groups (sulfonic acid group content: $1.5 \times 10^{-4}$ eq/g; epoxy group content: $6 \times 10^{-4}$ eq/g) and having a mean degree of polymerization of 250 | 8 parts by weight |
| Polyurethane having sulfonic acid groups and having a number average molecular weight measured by GPC of 25000, a weight average molecular weight measured by GPC of 49000 and a sulfonic acid content of $1.9 \times 10^{-4}$ eq/g | 5 parts by weight |
| Stearic acid | 1.5 parts by weight |
| 2-Ethylhexyl oleate | 2 parts by weight |
| Polyisocyanate (Coronate L; trade name of product of Nippon Polyurethane Industrial Co.) | 3 parts by weight |
| Methyl ethyl ketone | 80 parts by weight |
| Toluene | 40 parts by weight |
| Cyclohexanone | 80 parts by weight |

Formulation of Nonmagnetic Coating Composition:

| | |
|---|---|
| Acicular α-Fe₂O₃ surface-treated with Al₂O₃, having a mean major axis of 0.07 μm and an axial ratio of 6 | 100 parts by weight |
| Carbon black having a mean primary particle size of 0.023 μm, a specific surface area of 125 m²/g, a DBP oil absorption of 56 g/100 g, and pH of 2.5 | 8 parts by weight |
| Alumina having a mean particle size of 0.2 μm and a specific surface area of 14 m²/g | 3 parts by weight |
| Polyvinyl chloride resin having sulfonic acid groups and epoxy groups (sulfonic acid group content: $1.5 \times 10^{-4}$ eq/g; epoxy group content: $6 \times 10^{-4}$ eq/g) and having a mean degree of polymerization of 250 | 8 parts by weight |
| Polyurethane having sulfonic acid groups and having a number average molecular weight measured by GPC of 25000, a weight average molecular weight measured by GPC of 49000 and a sulfonic acid content of $1.9 \times 10^{-4}$ eq/g | 6 parts by weight |
| Polyisocyanate (Coronate HX; trade name of product of Nippon Polyurethane Industrial Co.) | 3 parts by weight |
| Oleyl oleate | 1 part by weight |
| Myristic acid | 1 part by weight |
| Methyl ethyl ketone | 80 parts by weight |
| Toluene | 40 parts by weight |
| Cyclohexanone | 120 parts by weight |

Formulation of Coating Composition for Back Coat Layer:

| | |
|---|---|
| size of 0.028 μm, a specific surface area of 65 m²/g, a DBP oil absorption of 53 g/100 g, and pH of 2.5 | 32 parts by weight |
| Carbon black having a mean primary particle size of 0.062 μm, a specific surface area of 35 m²/g, a DBP oil absorption of 62 g/100 g and pH of 8.0 | 8 parts by weight |
| "Nippolan 2301" (trade name of product of Nippon Polyurethane Co.) | 20 parts by weight |
| Nitrocellulose (product of Hercules Powder Co., having a designated viscosity of ½ seconds) | 20 parts by weight |
| Polyisocyanate (D-250N; trade name of product of Takeda Chemical Industries, Ltd.) | 4 parts by weight |
| Copper phthalocyanine | 5 parts by weight |
| Stearic acid | 1 part by weight |
| Methyl ethyl ketone | 140 parts by weight |
| Toluene | 140 parts by weight |
| Cyclohexanone | 140 parts by weight |

Production of Magnetic Recording Medium:

The above-mentioned nonmagnetic coating composition and the above-mentioned magnetic coating composition (a) were coated on one surface of the above-mentioned magnetic support (I) by a wet-on-wet system for simultaneous two-layer coating to form thereon a nonmagnetic layer and a magnetic layer which might have the dry thickness shown in Table 1 below. While still wet, the thus-coated magnetic layer was oriented in a magnetic field by passing the coated support through a solenoid at 5000 Oe. Then, this was dried at 80° C. and wound up. Next, this was calendered at 85° C. and at 350 kg/cm to make it have the nonmagnetic layer and the magnetic layer. Afterwards, the above-mentioned coating composition for a back coat layer was coated over the back surface of the magnetic support at a dry thickness of 0.5 μm and then dried at 90° C. This was wound up. Next, this was aged at 50° C. for 16 hours and then slit into magnetic tape samples each having a width of 3.81 mm.

The magnetic characteristics of the magnetic support and the magnetic layer and also the output characteristic of the magnetic tape sample (at 7.5 MHz) were measured according to the methods mentioned below. The results obtained are shown in Table 1.

Methods for Measuring Characteristics of Sample Tapes:
(1) Magnetic Characteristic:

The magnetic support was cut out into a shape having a predetermined size. Only the magnetic layer that had been coated on the nonmagnetic layer was peeled off from the magnetic support, using an adhesive tape, and this was also cut out into a shape having a predetermined size. Using a vibratory magnetometer, the coercive force of these samples was measured in a magnetic field at 10 kOe.

(2) Output:

The magnetic tape sample having a width of 3.81 mm was charged in a DAT cassette to obtain a DAT tape cassette sample. This was set in a commercially available recorder, Tape Evaluator Model 4500 (trade name of product of Media Logic Co.) and a signal of 4.7 MHz was recorded on the magnetic tape. Reproducing this, the output (reproduction output) of the tape was measured. The recording wavelength at 4.7 MHz was 0.67 μm.

EXAMPLE 2

A magnetic tape sample was produced in the same manner as in Example 1, except that the above-mentioned magnetic support (II) was used and that the nonmagnetic layer and the magnetic layer formed thereon were made to have the thickness indicated in Table 1. This was evaluated in the same manner as in Example 1. The results obtained are shown in Table 1.

EXAMPLE 3

A magnetic tape sample was produced in the same manner as in Example 1, except that the above-mentioned magnetic support (III) and magnetic coating composition (b) were used and that the nonmagnetic layer and the magnetic layer formed thereon were made to have the thickness indicated in Table 1. This was evaluated in the same manner as in Example 1. The results obtained are shown in Table 1.

EXAMPLE 4

A magnetic tape sample was produced in the same manner as in Example 1, except that the above-mentioned magnetic coating composition (c) was used and that the nonmagnetic layer and the magnetic layer formed thereon were made to have the thickness indicated in Table 1. This was evaluated in the same manner as in Example 1. The results obtained are shown in Table 1.

Comparative Example 1

A magnetic tape sample was produced in the same manner as in Example 1, except that the above-mentioned nonmagnetic support was used and that the nonmagnetic layer and the magnetic layer formed thereon were made to have the thickness indicated in Table 1. This was evaluated in the same manner as in Example 1. The results obtained are shown in Table 1.

Comparative Example 2

A magnetic tape sample was produced in the same manner as in Example 3, except that the above-mentioned nonmagnetic support was used. This was evaluated in the same manner as in Example 1. The results obtained are shown in Table 1.

Comparative Example 3

A magnetic tape sample was produced in the same manner as in Example 4, except that the above-mentioned nonmagnetic support was used. This was evaluated in the same manner as in Example 1. The results obtained are shown in Table 1.

Comparative Example 4

A magnetic tape sample was produced in the same manner as in Example 1, except that the above-mentioned magnetic support (I) and magnetic coating composition (d) were used and that the nonmagnetic layer and the magnetic layer formed thereon were made to have the thickness indicated in Table 1. This was evaluated in the same manner as in Example 1. The results obtained are shown in Table 1.

Comparative Example 5

A magnetic tape sample was produced in the same manner as in Example 1, except that the above-mentioned magnetic support (II) and magnetic coating composition (e) were used and that the nonmagnetic layer and the magnetic layer formed thereon were made to have the thickness indicated in Table 1. This was evaluated in the same manner as in Example 1. The results obtained are shown in Table 1.

Comparative Example 6

A magnetic tape sample was produced in the same manner as in Example 2, except that the nonmagnetic layer and the magnetic layer formed thereon were made to have the thickness indicated in Table 1. This was evaluated in the same manner as in Example 1. The results obtained are shown in Table 1.

Comparative Example 7

A magnetic tape sample was produced in the same manner as in Example 1, except that the above-mentioned magnetic support (III) was used and that the nonmagnetic layer and the magnetic layer formed thereon were made to have the thickness indicated in Table 1. This was evaluated in the same manner as in Example 1. The results obtained are shown in Table 1.

TABLE 1

|  | Example | | | | Comparative Example | | | | | | |
| --- | --- | --- | --- | --- | --- | --- | --- | --- | --- | --- | --- |
|  | 1 | 2 | 3 | 4 | 1 | 2 | 3 | 4 | 5 | 6 | 7 |
| Support | (I) | (II) | (III) | (I) | Nonmagnetic Support | Nonmagnetic Support | Nonmagnetic Support | (I) | (II) | (II) | (III) |
| Coating Composition for Magnetic Layer | (a) | (a) | (b) | (c) | (a) | (b) | (c) | (d) | (e) | (a) | (a) |
| Magnetic Layer (μm) | 0.5 | 1.1 | 0.3 | 0.7 | 0.5 | 0.3 | 0.7 | 0.5 | 0.5 | 2.0 | 0.5 |
| Nonmagnetic Layer (μm) | 1.5 | 0.7 | 1.5 | 0.8 | 1.5 | 1.5 | 0.8 | 1.5 | 1.5 | 1.0 | 0.3 |
| Coercive Force of Magnetic Layer (Oe) | 1920 | 1910 | 2170 | 1620 | 1920 | 2170 | 1630 | 1280 | 2970 | 1910 | 1920 |
| Output at 7.5 MHz (dB) | +0.7 | +0.4 | +1.1 | +0.8 | 0 | −0.3 | −0.2 | −1.1 | (*1) | −1.7 | (*2) |

The output was based on the sample of Comparative Example 1.
*1: Recording was impossible since the magnetic field around the head was insufficient.
*2: As having been coated unevenly, the sample was difficult to measure.

From the data shown in Table 1, it is known that the magnetic tapes obtained in the examples, which all had the magnetic support containing a soft magnetic powder or a powder of iron oxide with low remanent induction and in which the magnetic layer had a thickness falling between 0.05 μm and 1.5 μm and had a coercive force falling between 1300 Oe and 2500 Oe, exhibited a satisfactory output characteristic and that the magnetic tapes obtained in the comparative examples, in which the conventional nonmagnetic support was used, or the thickness of the magnetic layer was outside the above-mentioned range (in the sample of Comparative Example 7, the measurement of the thickness of the magnetic layer was impossible since the layer could not be coated uniformly) or the coercive force of the magnetic layer was outside the above-mentioned range (the coercive force of the sample of Comparative Example 5 could not be recorded as being too large) were all inferior to those obtained in the examples in terms of the output characteristic.

As has been demonstrated hereinabove, the magnetic recording medium of the present invention exhibits an excellent output characteristic in a high-frequency zone.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a magnetic support containing a magnetic powder, and at least a nonmagnetic layer provided on the magnetic support and a magnetic layer provided on the nonmagnetic layer, which is characterized in that the magnetic layer has a thickness of from 0.05 to 1.5 μm, the nonmagnetic layer has a thickness of from 0.5 to 4 μm and the magnetic layer has a coercive force of from 1300 to 2500 Oe.

2. The magnetic recording medium as in claim 1, in which the magnetic powder is one or more powders selected from the group consisting of a powder of soft magnetic materials, a powder of iron oxide with low remanent induction and a powder of hard magnetic materials.

3. The magnetic recording medium as in claim 1, in which the magnetic powder comprises a powder of a soft magnetic material and/or a powder of iron oxide with low remanent induction.

4. The magnetic recording medium as in claim 1, in which the magnetic layer and the nonmagnetic layers have been formed on the magnetic support by a wet-on-wet coating system.

5. The magnetic recording medium of claim 1, wherein said magnetic powder is a powder of a soft magnetic material selected from the group consisting of iron-silicon alloys, iron-aluminum alloys, iron-nickel alloys, iron-cobalt alloys, iron-cobalt-nickel alloys, nickel-cobalt alloys, Sendust, manganese-zinc ferrites, nickel-zinc ferrites, magnesium-zinc ferrites, and magnesium-manganese ferrites.

6. The magnetic recording medium of claim 1, wherein said magnetic powder is a powder of iron oxide having a remanence of 30 emu/g or less and a coercive force of 150 Oe or less.

* * * * *